US012180779B2

(12) United States Patent
Greening

(10) Patent No.: US 12,180,779 B2
(45) Date of Patent: Dec. 31, 2024

(54) SHUTTER ASSEMBLY

(71) Applicant: LOUVER-LITE LIMITED, Hyde (GB)

(72) Inventor: Andrew Greening, Hyde (GB)

(73) Assignee: LOUVER-LITE LIMITED, Hyde (GB)

( * ) Notice: Subject to any disclaimer, the term of this patent is extended or adjusted under 35 U.S.C. 154(b) by 116 days.

(21) Appl. No.: 17/797,831

(22) PCT Filed: Feb. 8, 2021

(86) PCT No.: PCT/EP2021/052985
§ 371 (c)(1),
(2) Date: Aug. 5, 2022

(87) PCT Pub. No.: WO2021/156515
PCT Pub. Date: Aug. 12, 2021

(65) Prior Publication Data

US 2023/0056840 A1 Feb. 23, 2023

(30) Foreign Application Priority Data

Feb. 7, 2020 (GB) .................................... 2001727

(51) Int. Cl.
*E06B 3/26* (2006.01)
*E06B 3/40* (2006.01)
*E06B 9/06* (2006.01)

(52) U.S. Cl.
CPC .................. *E06B 3/26* (2013.01); *E06B 3/40* (2013.01); *E06B 9/0638* (2013.01); *E06B 2003/406* (2013.01)

(58) Field of Classification Search
CPC ........ E06B 3/26; E06B 3/40; E06B 2003/406; E06B 9/0638
See application file for complete search history.

(56) References Cited

U.S. PATENT DOCUMENTS 3,222,734 A * 12/1965 Punt ...................... E06B 3/2605 49/63
3,293,802 A * 12/1966 Fletcher .................... E06B 3/44 49/421
(Continued)

FOREIGN PATENT DOCUMENTS

CN 209324235 U 8/2019
FR 2045563 A1 * 3/1971
(Continued)

OTHER PUBLICATIONS

International Search Report and Written Opinion received in PCT/EP2021/052985 dated May 27, 2021, p. 11.

*Primary Examiner* — Adriana Figueroa
(74) *Attorney, Agent, or Firm* — Liang & Hennessey LLP; Brian Hennessey

(57) ABSTRACT

A shutter assembly comprising a shutter door, an inner frame and an outer frame, wherein the shutter door defines an aperture and includes two or more rotatable vanes, wherein the vanes have a first orientation in which they completely obscure the aperture and a second orientation in which they partially obscure the aperture; the shutter door is hingedly coupled to the inner frame; and the inner frame is secured to the outer frame.

7 Claims, 5 Drawing Sheets

(56) References Cited

U.S. PATENT DOCUMENTS

| | | | | | |
|---|---|---|---|---|---|
| 3,908,730 | A * | 9/1975 | Goss, Jr. | E06B 3/28 | 160/90 |
| 3,932,959 | A * | 1/1976 | Jansons | E06B 7/084 | 52/473 |
| 5,564,164 | A * | 10/1996 | Jella | E06B 9/581 | 16/355 |
| 5,622,012 | A * | 4/1997 | Schijf | E06B 3/485 | 52/592.2 |
| 5,915,444 | A | 6/1999 | Sastri et al. | | |
| 6,513,862 | B2 * | 2/2003 | Dodson | E06B 3/486 | 296/147 |
| 6,810,619 | B2 * | 11/2004 | Wilson | E06B 7/09 | 49/74.1 |
| 2003/0009946 | A1 | 1/2003 | Wilson | | |
| 2018/0135351 | A1 * | 5/2018 | Walker | E06B 7/09 | |

FOREIGN PATENT DOCUMENTS

| | | | | |
|---|---|---|---|---|
| GB | 1486550 | A * | 9/1977 | E06B 3/485 |
| SE | 0123508 | A2 * | 10/1984 | |
| WO | WO-9730257 | A1 * | 8/1997 | E05D 1/04 |

* cited by examiner

SHUTTER ASSEMBLY

CROSS-REFERENCE TO RELATED APPLICATIONS

The present application is a national phase application of PCT Application No. PCT/EP2021/052985, filed 8 Feb. 2021, entitled "SHUTTER ASSEMBLY", which claims the benefit of British Patent Application No. 2001727.3, filed Feb. 7, 2020, each of which is incorporated by reference in its entirety.

The present invention relates to shutter assemblies, in particular shutter assemblies for windows that include an openable shutter door and a frame.

Shutter assemblies for windows are well known and have existed for decades. In a typical shutter assembly, a shutter frame is screwed to a window frame and a shutter door is hingedly coupled to the shutter frame. In such an arrangement, the hinge assembly is usually visible and there are gaps between the shutter door and the shutter frame, and sometimes also between the shutter frame and the window frame to which it is secured. The visible hinge assembly is aesthetically unpleasing and the gaps between the shutter door and the shutter frame generate unwanted light strike (i.e. unwanted light entering the room from outside in the gaps). Finally, if it is desired to remove a shutter door for any reason, e.g. maintenance or cleaning, either the hinge assembly need to be removed or the shutter frame must be unscrewed from the window frame.

The present invention seeks to address one or more of the problems associated with known shutter assemblies.

According to a first aspect of the invention, there is provided a shutter assembly comprising a shutter door, an inner frame and an outer frame, wherein the shutter door defines an aperture and includes two or more rotatable vanes, wherein the vanes have a first orientation in which they completely obscure the aperture and a second orientation in which they partially obscure the aperture; the shutter door is hingedly coupled to the inner frame; and the inner frame is secured to the outer frame.

By providing a shutter door which is hinged to an inner frame, the shutter door and inner frame may be readily installed or removed from the outer frame, which in use is secured to the window frame. This makes it easier to install and uninstall the shutter door, as it forms a single component with the inner frame which may be secured or released from the outer frame in a straightforward manner.

In addition, the fit between shutter door and the inner frame may be configured to minimise light strike between these components.

In an embodiment of the invention, the shutter door includes a hinge side portion which includes a first part of a hinge assembly; the inner frame includes a corresponding hinge side portion which includes a second part of a hinge assembly; the first part of the hinge assembly is wholly located within the shutter door hinge side portion; and the second part of the hinge assembly is wholly located within the inner frame hinge side portion.

An arrangement according to this embodiment of the invention results in an "internal" hinge arrangement in which the hinge assembly is hidden from view in use.

The skilled person will appreciate that the term "the first part of the hinge assembly is wholly located within the shutter door hinge side portion" means that no part of the hinge assembly extends beyond the hinge side portion of the shutter door. Thus, no part of the hinge lies outside of the length and width dimensions of the hinge side portion of the shutter door. Similarly, the term "the second part of the hinge assembly is wholly located within the inner frame hinge side portion" means that no part of the hinge assembly extends beyond the hinge side portion of the inner frame.

Accordingly, no part of the hinge assembly is visible when the shutter door is in a closed configuration in which the shutter door lies within the space defined within the inner frame (i.e. each side of the shutter door lies adjacent to a corresponding side of the inner frame). The hinge assembly may only be accessed when the shutter door is in an open configuration in which at least a part of the shutter door lies outside of a plane defined by the inner frame.

Thus, the shutter door may have an open configuration in which at least a part of the shutter door lies outside of a plane defined by the inner frame and the hinge assembly is accessible; and a closed configuration in which the shutter door lies within the space defined within the inner frame and the hinge assembly is not visible or accessible.

In a further embodiment of the invention, the hinge side portion of the shutter door includes an inner wall and an outer wall, wherein the outer wall is angled with respect to the inner wall. The inner wall of the hinge side portion is suitably parallel to an inner wall of an opposite side and perpendicular to walls of a top door member and a bottom door member such that the inner walls together define a rectangular space having a defined depth. For example, the hinge side portion of the shutter door may have a cross-sectional shape that is triangular or trapezoidal. In such embodiments, the outer wall of the hinge side portion may be angled away from the inner wall.

The first part of the hinge assembly is suitably secured to the outer wall.

The angle subtended between the inner wall and the outer wall may be from 10° to 60°, for example from 15° to 45° or from 20° to 40°.

In embodiments in which shutter door includes a hinge side portion have an outer wall which is angled relative to an inner wall, the hinge side portion of the inner frame may include an outer wall and an inner wall, wherein the inner wall is angled with respect to the outer wall and wherein the angle subtended between the inner wall and the outer wall of the inner frame hinge side portion is substantially the same as the angle subtended between the inner wall and the outer wall of the shutter door hinge side portion. Thus, the hinge side portion of the inner frame may have a shape that is complementary to the shape of the hinge side portion of the shutter door.

As noted above, the hinge side portion of the inner frame may have a cross-sectional shape that is triangular or trapezoidal. In such embodiments, the inner wall of the hinge side portion may be angled away from the outer wall.

The second part of the hinge assembly is suitably secured to the inner wall.

The angle subtended between the inner wall and the outer wall may be from 10° to 60°, for example from 15° to 45° or from 20° to 40°.

The angled nature of the hinge side portions reduces or eliminates light strike between the shutter door and the inner frame.

All of the inner side walls of the inner frame may be angled with respect to an axis perpendicular to a plane within which the inner frame is located and the outer side walls of the shutter door may have define a corresponding angle such that light strike is minimised or prevented around the entire periphery of the shutter door.

In embodiments in which the shutter assembly includes two shutter doors located within the inner frame (i.e. a left door and a right door), one or both of the doors may include a strip which extends from a distal side of the or each door (i.e. the sides of the doors furthest from the hinge side), wherein the strip overlies a gap defined between distal sides of the two doors. In such an arrangement, any light strike between adjacent doors located within the inner frame is minimised or prevented.

It should appreciated that reference herein to “inner” refers to portions of the relevant component that are located towards or closer to the centre of the frames and reference to “outer” is intended to refer to portions of the relevant component that are located away from or further from the centre of the frames.

In an embodiment of the invention, the hinge side portion of the shutter door defines a first arcuate projecting element; a portion of the first part of the hinge assembly is located within the first arcuate projecting element; the hinge side portion of the inner frame defines a second arcuate element; a portion of the second part of the hinge assembly is located within the second arcuate element; the radius of the first arcuate element is less than the radius of the second arcuate element; and wherein the first arcuate element rotates within the second arcuate element. The rotation of the first arcuate element within the second arcuate element protects the hinge assembly and effectively increases the hinging surfaces. This in turn makes the hinge stronger and prevents or reduces the dropping or sagging of the shutter door relative to the inner frame.

The first arcuate element suitably projects from one wall of the hinge side portion of the shutter door, for example from the outer side wall of the shutter door hinge side portion. Additionally, the second arcuate element may be defined within the inner wall of the inner frame hinge side portion. Thus, the second arcuate element may be a concave element.

Both the first and second arcuate elements may extend along the entire length of the hinge side portion of the shutter door and inner frame respectively.

In order to avoid using fixings such as screws or bolts between the inner frame and the outer frame, the inner frame may be reversibly secured to the outer frame. For example, the inner frame may be secured to the outer frame via two or more detachable fixing clips. The fixing clips may form a friction fit or a snap fit between the inner frame and the outer frame. In other words, a gap may be defined between the inner frame and the outer frame and each fixing clip may form a friction fit or a snap fit within the gap. For example, one or two fixing clips may be provided between each of the adjacent sides of the inner frame and the outer frame.

Each fixing clip may include a resiliently deformable leg which either provides the desired frictional force between the inner frame and the outer frame or which engages a respective channel or detent to provide a snap fit engagement between the inner frame and the outer frame.

In order to reduce or prevent light strike between the outer frame and the inner frame, the outer frame may include an inwardly extending skirt around its periphery, which overlies at least a portion of the inner frame. Thus, the skirt overlies the gap defined between the inner frame and the outer frame and thereby prevents light penetrating through this gap.

The rotatable vanes of the shutter door may have a conventional shape, in other words, each vane has a symmetrical cross-section (i.e. a section perpendicular to its longitudinal axis), or it may have an asymmetrical cross-sectional shape. For example, the vane may have an aerofoil shape in which the curvature of the upper surface is greater than the curvature of the lower surface or it may define a convex upper surface and include a lower surface which includes both convex and concave portions.

The advantage of the symmetrical shape vane is that they can close the aperture defined by the shutter door in either their fully clockwise orientation or their fully anti-clockwise orientation. However, light may be able to pass between such vanes in either of these end-point orientations. In contrast, the asymmetric shaped vanes may reduce the light strike between adjacent vanes, but only in one of the fully clockwise or fully anti-clockwise orientations. In the other of the tow end-point orientations, the light strike between adjacent blinds is typically greater than between adjacent symmetric vanes in the same orientation.

According to a second aspect of the invention, there is provided a window including a window frame, a glazing element and a shutter assembly as defined anywhere herein in connection with the first aspect of the invention, wherein the outer frame of the shutter assembly is secured to the window frame.

The outer frame may be secured to the window frame via an adhesive layer, via fixings (such as screws, for example) or via a two-part detachable coupling. The two-part detachable coupling typically includes a first part of the coupling being secured to the outer frame of the shutter assembly and a second part of the coupling being secured to the window frame. Such couplings include, for example a magnetic coupling in which a first magnetic element having a first polarity is secured to the window frame and a second magnetic element having the opposite polarity is secured to the outer frame of the shutter assembly; and a hook and eye coupling, in which a hook element is secured to one of the window frame and the outer frame and an eye element is secured to the other of the window frame and the outer frame of the shutter assembly.

Thus, the outer frame of the shutter assembly may be fixed or detachably coupled to the window frame.

The skilled person will appreciate that the features described and defined in connection with the aspects of the invention and the embodiments thereof may be combined in any combination, regardless of whether the specific combination is expressly mentioned herein. Thus, all such combinations are considered to be made available to the skilled person.

An embodiment of the invention will now be described, by way of example only, with reference to the accompanying drawings in which.

Figure 6A:
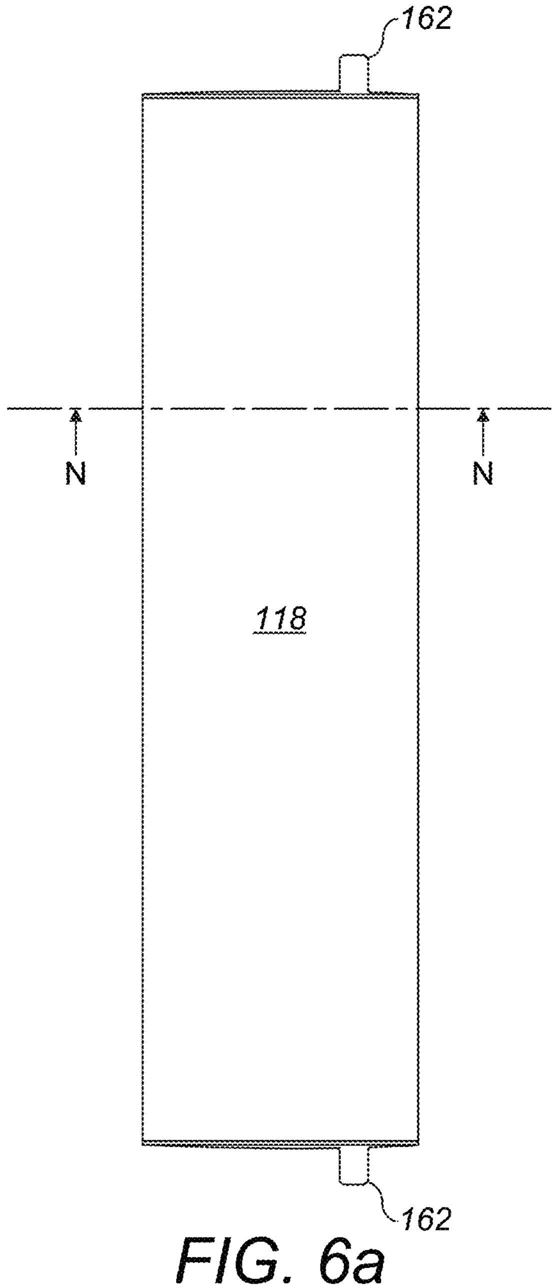
Figure 6B:
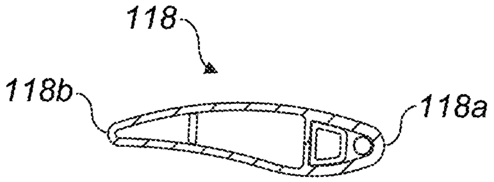

FIG. 6*a* shows a plan view from above of an alternative vane;

FIG. 6*b* shows a cross section through the alternative vane shown in FIG. 6*a;*

Figure 7A:
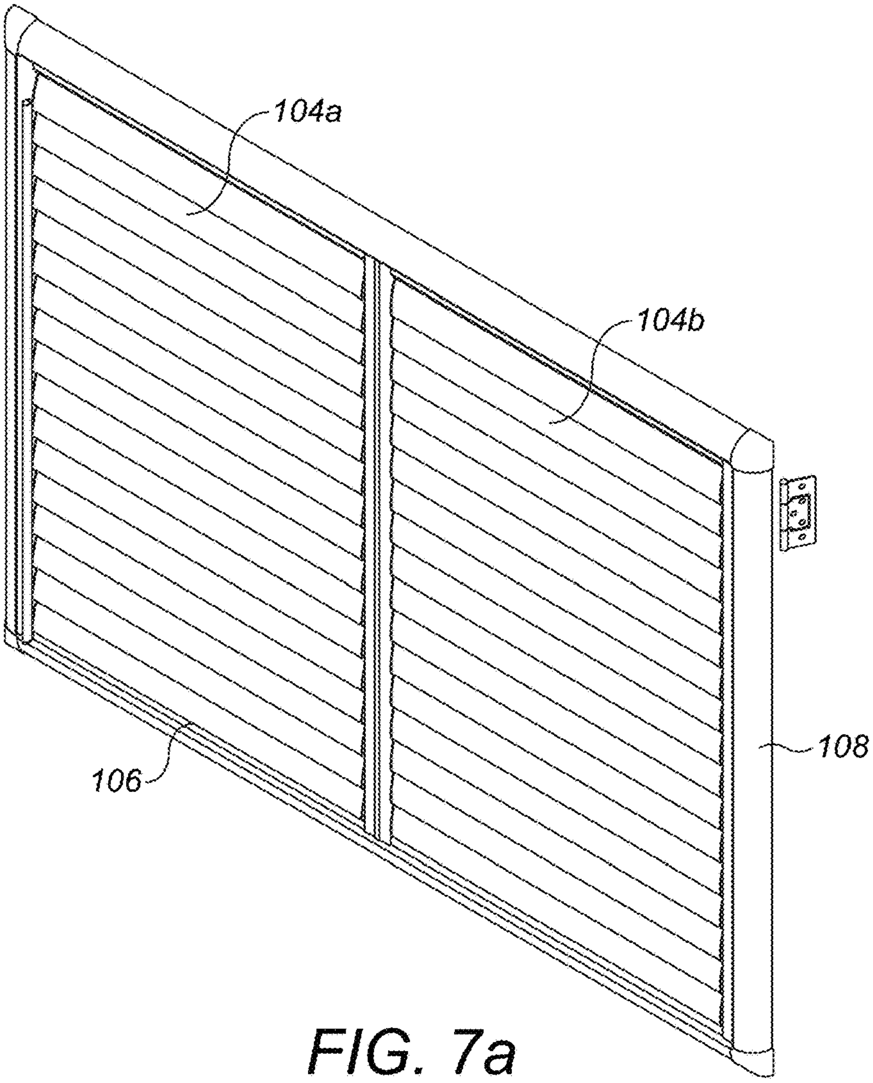
Figure 7B:
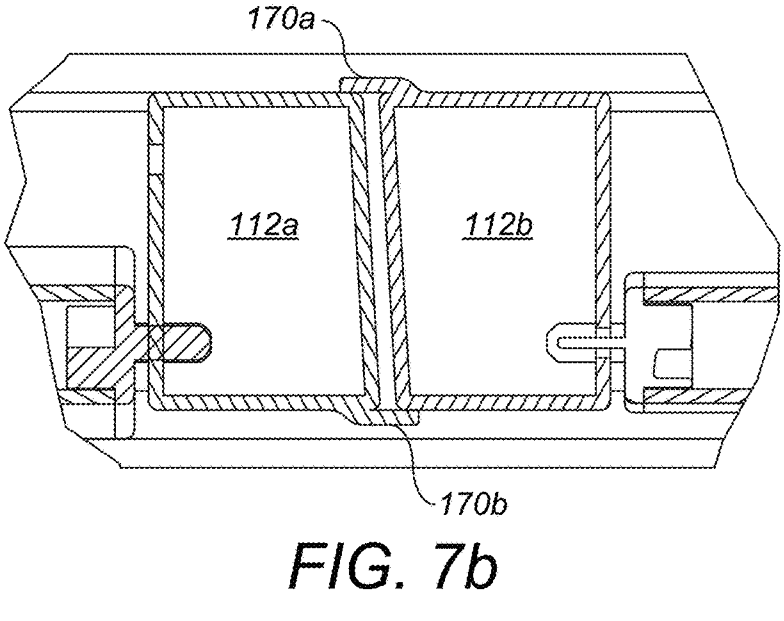

FIG. 7*a* shows a perspective view of a second embodiment of the invention which includes two shutter doors within the inner frame; and FIG. 7*b* shows a cross section through the distal ends of the two shutter doors shown in FIG. 7*a*.

For the avoidance of doubt, the skilled person will appreciate that in this specification, the terms “up”, “down”, “front”, “rear”, “upper”, “lower”, “width”, etc. refer to the orientation of the components as found in the example when installed for normal use as shown in the Figures.

Figure 1:
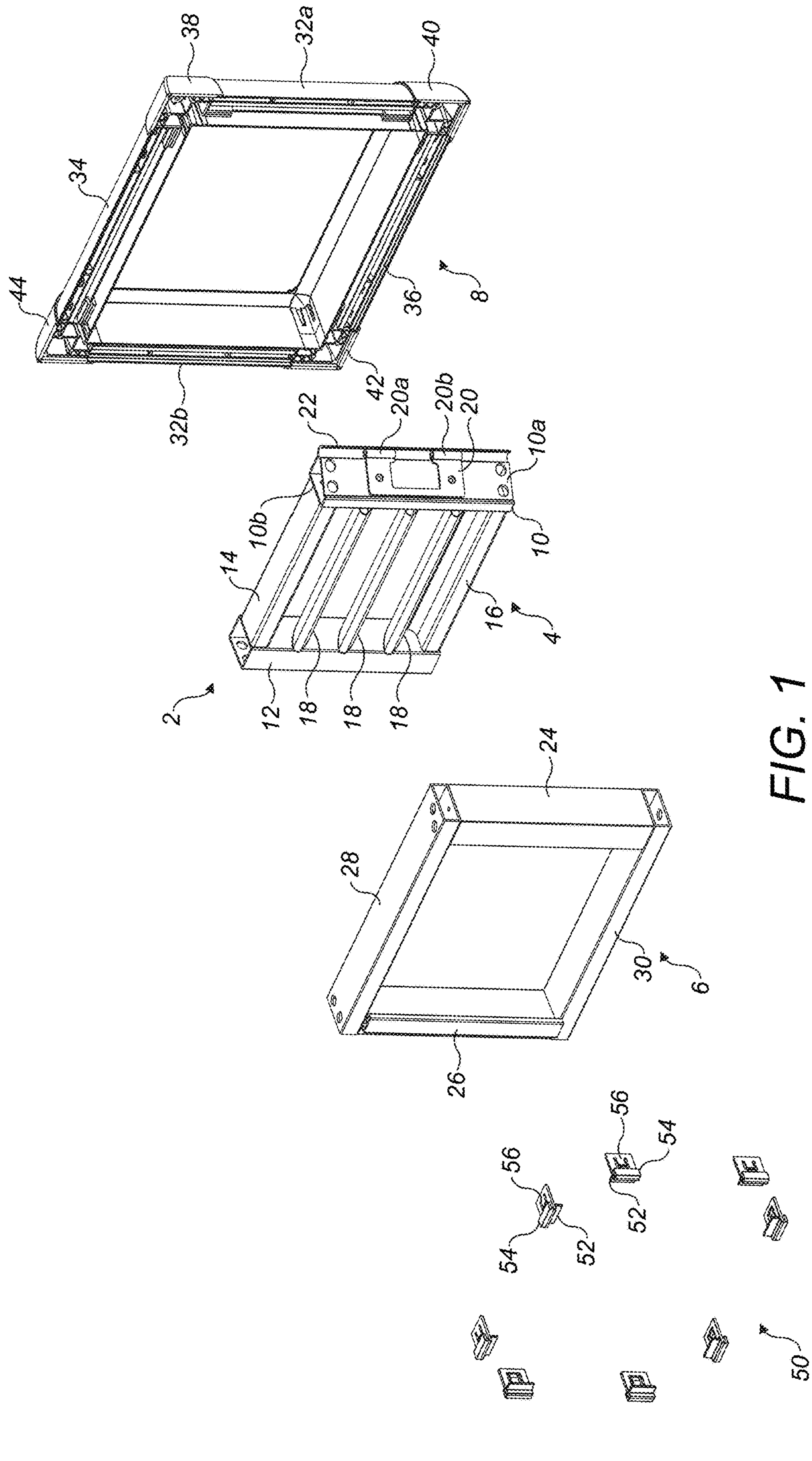
FIG. 1 shows an exploded view from the rear of a shutter assembly according to the first aspect of the invention.
Figure 2:
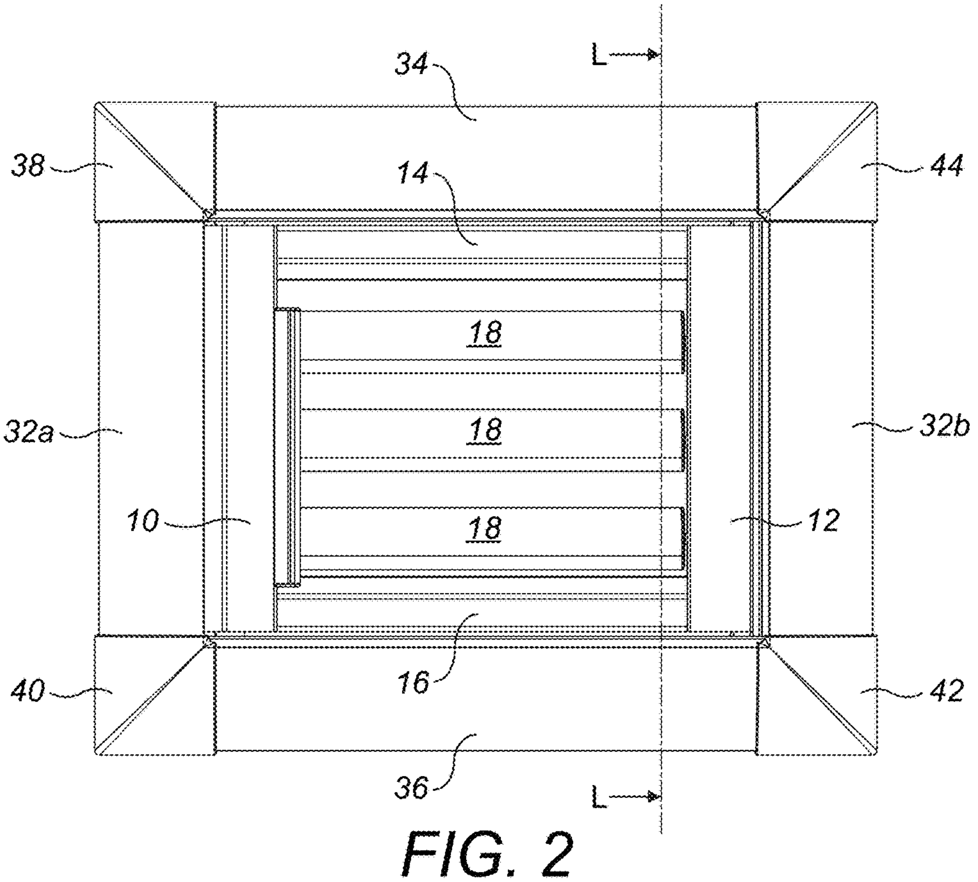
FIG. 2 shows a front elevational view of the shutter assembly shown in FIG. 1.

FIGS. 1 and 2 show a shutter assembly 2 comprising a shutter door 4, an inner shutter frame assembly 6 and an outer shutter frame assembly 8. When assembled, the shutter door 4 is located within the aperture defined by the inner frame assembly 6 and the inner frame assembly 6 is located within the aperture defined by the outer frame assembly 8.

The shutter door 4 comprises a hinge side member 10, a distal side member 12 opposite to the hinge side member 10, a top frame member 14 and a bottom frame member 16. The distal side member 12, the top frame member 14 and the bottom frame member 16 each have a rectangular cross-section. However, the hinge side member 10 has a trapezoidal cross-section, wherein an angled wall portion 10*a* of the hinge side member 10 tapers away from an inner wall portion 10*b* towards the front of the shutter door 4 (i.e. the portion of the shutter door facing the outer frame assembly 8 in FIG. 1).

A plurality of shutter vanes 18 are rotatably coupled to the hinge side member 10 and the distal side member 12 in a conventional way, wherein the vanes 18 are coupled such that the vanes 18 rotate together and remain in position after a rotational force has been removed.

The shutter door 4 further includes a first part 20 of a hinge assembly secured to the hinge side member 10. The first part 20 of the hinge assembly includes a pair of spaced apart body portions 20*a*, 20*b* which each define a cylindrical aperture, wherein the longitudinal axes of the cylindrical apertures are aligned with each other. Such hinge arrangements are well known.

The hinge side member 10 of the shutter door further includes a first arcuate projecting portion 22 which extends the length of the hinge side member 10 and which partially encloses the spaced apart body portions 20*a*, 20*b*.

The arrangement of the hinge side member 10 is shown in more detail in FIG. 4 and discussed further below.

The inner shutter frame assembly 6 comprises a hinge side wall 24, a distal side wall 26, a top frame wall 28 and a bottom frame wall 30. The distal side wall 26, the top frame wall 28 and the bottom frame wall 30 each have a rectangular cross-section. However, the hinge side wall 24 has a trapezoidal cross-section, which is complementary to the hinge side member 10 such that the hinge side member 10 and the hinge side wall 24 together define a substantially rectangular cross section (as shown in FIG. 4).

The hinge side wall includes a second part (not shown) of the hinge assembly which includes a body portion that defines a cylindrical aperture. The second part hinge body portion is located in used between the spaced body portions 20*a*, 20*b* of the first part 20 of the hinge assembly such that the longitudinal axis of the second part cylindrical aperture is aligned with the axes of the spaced apart cylindrical apertures of the first part 20 of the hinge assembly. A hinge pin (not shown) is located through the three cylindrical apertures. As noted above, this is an entirely conventional a hinge arrangement.

The outer frame assembly 8 comprises a pair of side frame members 32*a*, 32*b*, a top frame member 34 and a bottom frame member 36. Each of the frame members 32*a*, 32*b*, 34, 36 has a curved outer wall which projects inwardly beyond the respective inner walls of the frame members 32*a*, 32*b*, 34, 36. In this way, the curved outer walls cover the gaps defined between the inner frame assembly 6 and the outer frame assembly 8. The frame members 32*a*, 32*b*, 34, 36 are secured to adjacent frame members via corner brackets 38, 40, 42, 44. The frame members 32*a*, 32*b*, 34, 36 form snap fit couplings with the respective corner brackets 38, 40, 42, 44. However, the skilled person will appreciate that alternative couplings, such as friction fit couplings, or fixings, such as screws, could be used to secure the frame members 32*a*, 32*b*, 34, 36 to their respective corner brackets 38, 40, 42, 44.

The inner frame assembly 6 is secured to the outer frame assembly 8 via a number of fixing clips 50. Each clip 50 includes an engagement plate 52 that engages a rearwardly facing portion of a frame wall 24, 26, 28, 30 of the inner frame assembly. It also includes a U-shaped body portion 54 which defines between its opposed walls a gap sized to receive therein a rearwardly projecting portion 60 of a frame member wall of the outer frame assembly 8 (shown in more detail in FIGS. 4 and 5). Finally, each fixing clip 50 includes a resiliently deformable tongue 56 that includes a lug at its distal end. The lug of the tongue 56 engages a receiving channel (not shown) defined by the projecting portion of the side wall. In use, the inner frame assembly 6 is located within the aperture defined by the outer frame assembly 8. The clips 50 are then inserted into the gap between the inner frame assembly and the outer frame assembly. The engagement of the U-shaped body portion 54 of the clip 50 with the projecting portion 60 of the respective frame member of the outer frame assembly 8 prevents the forward displacement (i.e. to the right in FIG. 1) of the clip 50 relative to the outer frame member 32*a*, 32*b*, 34, 36. The engagement of the lug of the tongue 56 with the corresponding receiving channel prevents the rearward displacement of the clip 50 relative to the outer frame member 32*a*, 32*b*, 34, 36. In this way, the clip is fixed relative to the outer frame members 32*a*, 32*b*, 34, 36. The engagement plates 52 of the clips 50 engage rearwardly facing portions of a frame wall 24, 26, 28, 30 of the inner frame assembly. This prevents the rearward displacement of the inner frame assembly 6 relative to the clips 50 and thus relative to the outer frame assembly 8. As shown in FIG. 5, forward facing portions of the inner frame assembly engage rearward facing surface of the curved outer wall of the frame members 32*a*, 32*b*, 34, 36 of the outer frame assembly 8, which prevents the forward displacement of the inner frame assembly 6 relative to the outer frame assembly 8.

The clips 50 provide a quick, cheap and easy mechanism via which the inner frame assembly 6 is secured to the outer frame assembly 8. Furthermore, the depression of the tongues 56 of the clips 50 to disengage the lugs from the respective receiving channels permits the easy removal of the inner frame assembly 6 from the outer frame assembly 8.

Figure 3:
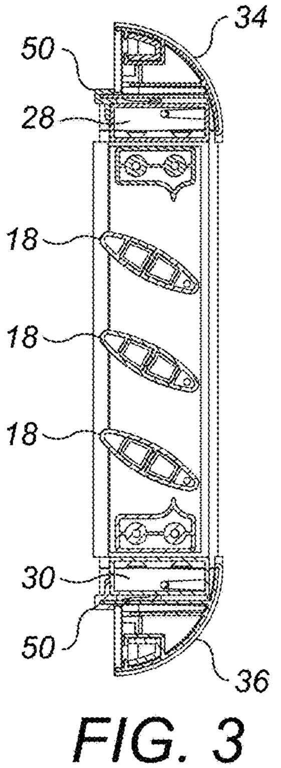
FIG. 3 shows a cross section through the shutter assembly as indicated by the line L-L.

FIG. 3 shows a cross section through the shutter assembly 2 shown in FIG. 2. As can be seen from FIG. 3, each of the vanes 18 are symmetrical about their width dimension (i.e. the longest dimension shown in FIG. 3 for the vanes) and about their thickness dimension.

Figure 4:
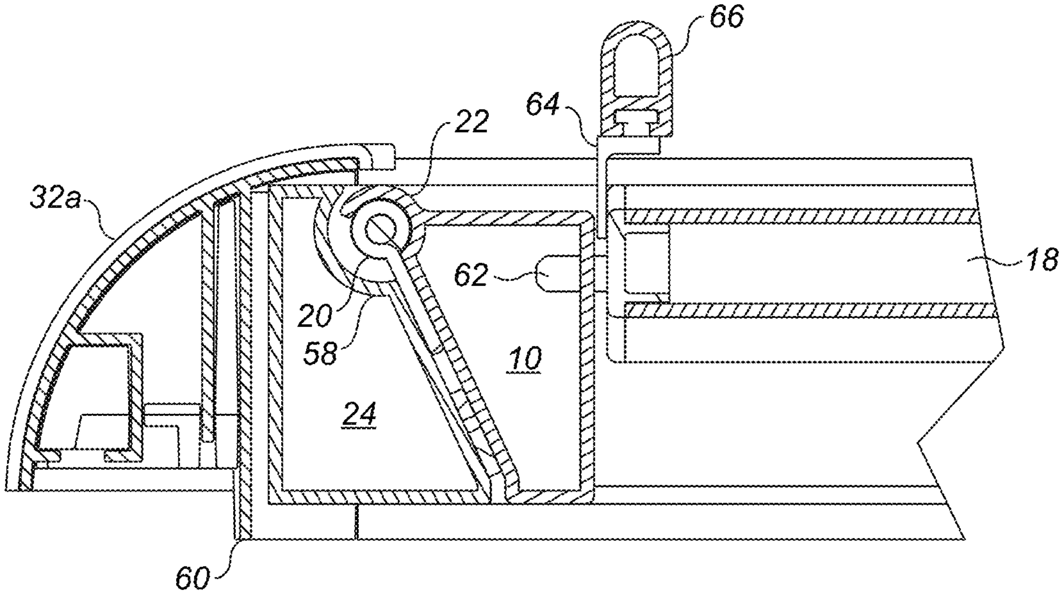
FIG. 4 shows a cross section through the hinge side portions of the shutter door and the inner frame.
Figure 5:
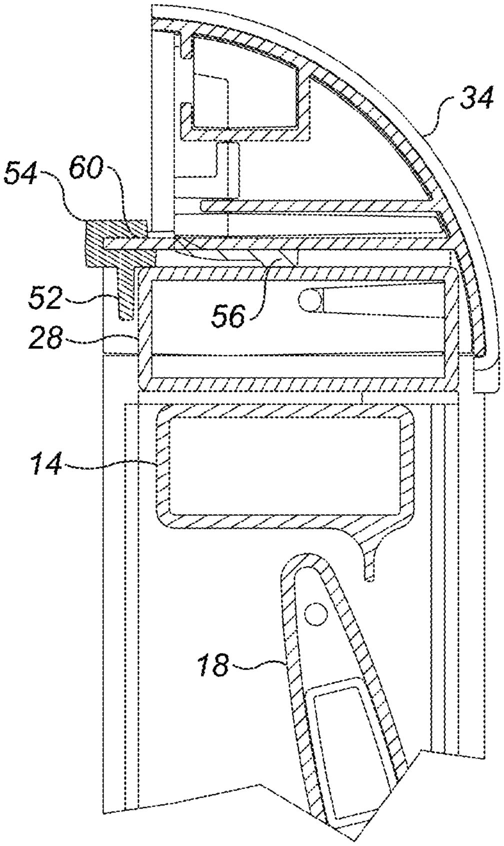
FIG. 5 shows a cross section through a portion of the shutter assembly showing the arrangement of the fixing clips.

FIG. 4 shows the hinge assembly in more detail. As can be seen in FIG. 4, the hinge side wall 24 of the inner frame assembly 6 defines a concave recess 58 along the length of the portion that faces the shutter door 4. The radius of the concave recess is such that the first arcuate projecting portion 22 is rotatable within the recess 58. Thus, the arrangement between the concave recess 58 and the first arcuate projecting portion reinforces and supports the hinge assembly.

Also shown in FIG. 4 is a more detailed view of the projecting portion 60 of the outer frame members 32*a*, 32*b*, 34, 36. As can be seen, the projecting portion extends beyond the inner frame assembly 6, as represented by the inner frame hinge wall 24 in FIG. 4.

FIG. 4 also shows in more detail how the vanes 18 are secured to the shutter door 4. As can be seen, each vane includes a pair of opposed spindles 62 (only the left spindle is shown in FIG. 4), which are rotatably received in circular bearings defined by the hinge side wall 24 and the distal side wall 26. The vanes 18 are all coupled to a common operating rod 64, such that the vanes 18 all rotate simultaneously. The rod 64 is provided with an operating handle 66 for ease of operation by a user.

FIG. 5 shows the fixing clip 50 in more detail. The U-shaped body portion 54 forms a friction fit over a portion of the projecting portion 60 of the outer frame assembly 8. The engagement plate 52 engages a rearward facing portion of the inner frame assembly, in this case represented by the top wall 28. Finally, the lug of the tongue 56 is engaged within a channel defined adjacent to the projecting portion 60.

FIGS. 6*a* and 6*b* show an alternative arrangement for the vanes. In this embodiment, each vane 118 has an aerofoil cross-sectional shape. Such a shape provides a better light-blocking effect when the vanes 118 are in a closed configuration. However, such vanes can only be closed by rotating a tail 118*b* portion of the vane 118 downwards such that it contacts or overlies a head portion 118*a* of the vane 118 immediately below it. In contrast, the vanes 18 of the embodiment shown in FIGS. 1 to 5 may be closed by either rotating the tail portions upwards or downwards towards the adjacent vanes 18. Each vane 118 is coupled to the shutter door in the same way as the vanes 18 described above, namely via opposed spindles 162.

FIGS. 7*a* and 7*b* show a third embodiment of the invention in which an inner frame assembly 106 receives a pair of opposed shutter doors 104*a*, 104*b*. The arrangements between the shutter doors 104*a*, 104*b* and the inner frame 106, and between the inner frame 106 and the outer frame 108 are the same as described hereinabove.

As shown in FIG. 7*b*, the shutter doors 104*a*, 104*b* each include a respective distal side portion 112*a*, 112*b* and each distal side portion 112*a*, 112*b* includes a projecting cover strip 170*a*, 170*b* which overlie the gap between the shutter doors 104*a*, 104*b* when in their closed configurations.

The skilled person will appreciate that many of the features of the shutter assemblies described hereinabove are conventional arrangements. As such, the skilled person is considered to be aware of such arrangements.

The invention claimed is:

1. A shutter assembly comprising:

a shutter door, an inner frame and an outer frame, wherein the shutter door defines an aperture and includes two or more rotatable vanes, wherein the vanes have a first orientation in which they completely obscure the aperture and a second orientation in which they partially obscure the aperture; the shutter door is hingedly coupled to the inner frame; and the inner frame is secured to the outer frame;

wherein the shutter door includes a hinge side portion which includes a first part of a hinge assembly, the inner frame includes a corresponding hinge side portion which includes a second part of the hinge assembly, the first part of the hinge assembly is wholly located within the shutter door hinge side portion, and the second part of the hinge assembly is wholly located within the inner frame hinge side portion;

wherein the hinge side portion of the shutter door includes an inner wall and an outer wall;

wherein the outer wall is angled with respect to the inner wall;

wherein the angle subtended between the inner wall and the outer wall is from 10° to 60°;

wherein the hinge side portion of the inner frame includes an outer wall and an inner wall;

wherein the inner wall is angled with respect to the outer wall; and wherein the angle subtended between the inner wall and the outer wall of the inner frame hinge side portion is substantially the same as the angle subtended between the inner wall and the outer wall of the shutter door hinge side portion.

2. A shutter assembly according to claim 1, wherein the hinge side portion of the shutter door defines a first arcuate projecting element;

a portion of the first part of the hinge assembly is located within the first arcuate projecting element;

the hinge side portion of the inner frame defines a second arcuate element;

a portion of the second part of the hinge assembly is located within the second arcuate element;

the radius of the first arcuate projecting element is less than the radius of the second arcuate element; and wherein the first arcuate projecting element rotates within the second arcuate element.

3. A shutter assembly according to claim 1, wherein the inner frame is secured to the outer frame via two or more detachable fixing clips.

4. A shutter assembly according to claim 3, wherein the fixing clips form a friction fit or a snap fit connection between the inner frame and the outer frame.

5. A shutter assembly according to claim 4, wherein the fixing clips each include a resiliently deformable leg.

6. A shutter assembly according to claim 1, wherein the outer frame includes an inwardly extending skirt around its periphery, which overlies at least a portion of the inner frame.

7. A window including comprising:

a window frame;

a glazing element; and a shutter assembly, wherein the shutter assembly comprises a shutter door, an inner frame and an outer frame, wherein the shutter door defines an aperture and includes two or more rotatable vanes, wherein the vanes have a first orientation in which they completely obscure the aperture and a second orientation in which they partially obscure the aperture; the shutter door is hingedly coupled to the inner frame; and the inner frame is secured to the outer frame;

wherein the outer frame of the shutter assembly is secured to the window frame;

wherein the shutter door includes a hinge side portion which includes a first part of a hinge assembly, the inner frame includes a corresponding hinge side portion which includes a second part of the hinge assembly, the first part of the hinge assembly is wholly located within the shutter door hinge side portion, and the second part of the hinge assembly is wholly located within the inner frame hinge side portion;

wherein the hinge side portion of the shutter door includes an inner wall and an outer wall;

wherein the outer wall is angled with respect to the inner wall;

wherein the angle subtended between the inner wall and the outer wall is from 10° to 60°;

wherein the hinge side portion of the inner frame includes an outer wall and an inner wall;

wherein the inner wall is angled with respect to the outer wall; and wherein the angle subtended between the inner wall and the outer wall of the inner frame hinge side portion is substantially the same as the angle subtended between the inner wall and the outer wall of the shutter door hinge side portion.

* * * * *